US010053619B2

(12) United States Patent
Saboowala et al.

(10) Patent No.: US 10,053,619 B2
(45) Date of Patent: *Aug. 21, 2018

(54) SILOXANE SURFACTANT ADDITIVES FOR OIL AND GAS APPLICATIONS

(71) Applicant: Flotek Chemistry, LLC, Marlow, OK (US)

(72) Inventors: Hasnain Saboowala, The Woodlands, TX (US); Randal M. Hill, The Woodlands, TX (US)

(73) Assignee: Flotek Chemistry, LLC, Marlow, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/489,423

(22) Filed: Sep. 17, 2014

(65) Prior Publication Data

US 2015/0068751 A1    Mar. 12, 2015

Related U.S. Application Data

(63) Continuation-in-part of application No. 14/445,006, filed on Jul. 28, 2014, which is a continuation-in-part of application No. 13/831,410, filed on Mar. 14, 2013, now abandoned, application No. 14/489,423, which is a continuation-in-part of application No. 13/831,410, filed on Mar. 14, 2013, now abandoned.

(51) Int. Cl.
C09K 8/584  (2006.01)
C09K 8/70   (2006.01)
C09K 8/60   (2006.01)
C09K 8/38   (2006.01)
C09K 8/536  (2006.01)
C09K 8/594  (2006.01)
C09K 8/94   (2006.01)

(52) U.S. Cl.
CPC ........... C09K 8/703 (2013.01); C09K 8/38 (2013.01); C09K 8/536 (2013.01); C09K 8/594 (2013.01); C09K 8/604 (2013.01); C09K 8/94 (2013.01)

(58) Field of Classification Search
CPC .... C09K 8/584; C09K 2208/28; C09K 8/035; C09K 8/52; C09K 8/602; C09K 8/604; C09K 8/68; C09K 8/885; C09K 8/92; C09K 11/025; C09K 19/2007; C09K 19/32; C09K 19/56; C09K 2019/0448; C09K 2019/207; C09K 8/26; C09K 8/36; C09K 8/703; C09K 8/74; E21B 43/16; E21B 43/267; E21B 43/26; E21B 8/602
See application file for complete search history.

(56) References Cited

U.S. PATENT DOCUMENTS

| 3,060,210 | A |   | 4/1961  | De              |
|-----------|---|---|---------|-----------------|
| 3,047,062 | A |   | 7/1962  | Meadors         |
| 3,299,112 | A | * | 1/1967  | Bailey ........ B01F 17/0071 516/199 |
| 3,347,789 | A |   | 10/1967 | Dickson et al.  |
| 3,368,624 | A |   | 2/1968  | Heuer et al.    |
| 3,483,923 | A |   | 12/1969 | Darley          |
| 3,710,865 | A |   | 1/1973  | Kiel            |
| 3,756,319 | A |   | 9/1973  | Holm et al.     |
| 3,760,881 | A |   | 9/1973  | Kiel            |
| 3,850,248 | A |   | 11/1974 | Carney          |
| 3,919,411 | A |   | 11/1975 | Glass et al.    |
| 4,005,020 | A |   | 1/1977  | McCormick       |
| 4,206,809 | A |   | 6/1980  | Jones           |
| 4,233,165 | A |   | 11/1980 | Salathiel et al.|
| 4,276,935 | A |   | 7/1981  | Hessert et al.  |
| 4,360,061 | A |   | 11/1982 | Canter et al.   |
| 4,414,128 | A |   | 11/1983 | Goffinet        |
| 4,472,291 | A |   | 9/1984  | Rosano          |
| 4,511,488 | A |   | 4/1985  | Matta           |
| 4,650,000 | A |   | 3/1987  | Andreasson et al.|
| 4,844,756 | A | * | 7/1989  | Forsberg ....... C06B 47/145 149/109.6 |
| 5,008,026 | A |   | 4/1991  | Gardner et al.  |
| 5,034,140 | A |   | 7/1991  | Gardner et al.  |
| 5,076,954 | A |   | 12/1991 | Loth et al.     |
| 5,083,613 | A |   | 1/1992  | Gregoli et al.  |
| 5,095,989 | A |   | 3/1992  | Prukop          |
| 5,217,531 | A |   | 6/1993  | Cheung          |
| 5,247,995 | A |   | 9/1993  | Tjon-Joe-Pin et al. |
| 5,310,002 | A |   | 5/1994  | Blauch et al.   |
| 5,356,482 | A |   | 10/1994 | Mehta et al.    |
| 5,567,675 | A |   | 10/1996 | Romocki         |
| 5,587,354 | A |   | 12/1996 | Duncan, Jr.     |
| 5,587,357 | A |   | 12/1996 | Rhinesmith      |
| 5,604,195 | A |   | 2/1997  | Misselyn et al. |
| 5,652,200 | A |   | 7/1997  | Davies et al.   |
| 5,665,689 | A |   | 9/1997  | Durbut          |
| 5,676,763 | A |   | 10/1997 | Salisbury et al.|
| 5,697,458 | A |   | 12/1997 | Carney          |
| 5,707,940 | A |   | 1/1998  | Bush et al.     |
| 5,762,138 | A |   | 6/1998  | Ford et al.     |

(Continued)

FOREIGN PATENT DOCUMENTS

| CA | 2595025   | 9/2006 |
|----|-----------|--------|
| CN | 102127414 | 7/2011 |

(Continued)

OTHER PUBLICATIONS

Scifinder Structure of Silwet L-77 dated Apr. 6, 2015.*

(Continued)

Primary Examiner — Kumar R Bhushan
(74) Attorney, Agent, or Firm — Wolf, Greenfield & Sacks, P.C.

(57) ABSTRACT

A well treatment additive includes a siloxane surfactant, a solvent and an aqueous phase. The solvent, in some embodiments, is a terpene hydrocarbon. Also disclosed is a method for using the well treatment additive to form and enhance the properties of foams useful for the treatment of oil and gas wells. Methods of using the novel well treatment foams include using the additives in a variety of well treatment processes including, but not limited to, acidizing operations, hydraulic fracturing operations, well remediation operations and water removal operations.

17 Claims, 4 Drawing Sheets

(56) References Cited

U.S. PATENT DOCUMENTS

| | | |
|---|---|---|
| 5,784,386 A | 7/1998 | Norris |
| 5,811,383 A | 9/1998 | Klier et al. |
| 5,830,831 A | 11/1998 | Chan et al. |
| 5,874,386 A | 2/1999 | Chan et al. |
| 5,925,233 A | 7/1999 | Miller et al. |
| 5,975,206 A | 11/1999 | Woo et al. |
| 5,977,032 A | 11/1999 | Chan |
| 5,990,072 A | 11/1999 | Gross et al. |
| 5,996,692 A | 12/1999 | Chan et al. |
| 6,046,140 A | 4/2000 | Woo et al. |
| 6,090,754 A | 7/2000 | Chan et al. |
| 6,110,885 A | 8/2000 | Chan |
| 6,112,814 A | 9/2000 | Chan et al. |
| 6,165,946 A | 12/2000 | Mueller et al. |
| 6,173,776 B1 | 1/2001 | Furman et al. |
| 6,191,090 B1 | 2/2001 | Mondin et al. |
| 6,228,830 B1 | 5/2001 | Vlasblom |
| 6,260,621 B1 | 7/2001 | Furman et al. |
| 6,291,405 B1 | 9/2001 | Lee et al. |
| 6,302,209 B1 | 10/2001 | Thompson, Sr. et al. |
| 6,364,020 B1 | 4/2002 | Crawshaw et al. |
| 6,486,115 B1 | 11/2002 | Weaver et al. |
| 6,581,687 B2 | 6/2003 | Collins et al. |
| 6,583,194 B2 | 6/2003 | Sendijarevic |
| 6,593,279 B2 | 7/2003 | Von Krosigk et al. |
| 6,613,720 B1 | 9/2003 | Feraud et al. |
| 6,729,402 B2 | 5/2004 | Chang et al. |
| 6,770,603 B1 | 8/2004 | Sawdon et al. |
| 6,793,025 B2 | 9/2004 | Patel et al. |
| 6,800,593 B2 | 10/2004 | Dobson, Jr. et al. |
| 6,818,595 B2 | 11/2004 | Benton et al. |
| 6,911,417 B2 | 6/2005 | Chan et al. |
| 6,914,040 B2 | 7/2005 | Deak et al. |
| 6,939,832 B2 | 9/2005 | Collins |
| 6,984,610 B2 | 1/2006 | Vonkrosigk et al. |
| 7,021,378 B2 | 4/2006 | Prokop |
| 7,134,496 B2 | 11/2006 | Jones et al. |
| 7,205,262 B2 | 4/2007 | Schwartz et al. |
| 7,205,264 B2 | 4/2007 | Boles |
| 7,231,976 B2 | 6/2007 | Berry et al. |
| 7,380,606 B2 | 6/2008 | Pursley et al. |
| 7,392,844 B2 | 7/2008 | Berry et al. |
| 7,407,915 B2 | 8/2008 | Jones et al. |
| 7,468,402 B2 | 12/2008 | Yang et al. |
| 7,481,273 B2 | 1/2009 | Javora et al. |
| 7,514,390 B2 | 4/2009 | Chan |
| 7,514,391 B2 | 4/2009 | Chan |
| 7,533,723 B2 | 5/2009 | Hughes et al. |
| 7,543,644 B2 | 6/2009 | Huang et al. |
| 7,543,646 B2 | 6/2009 | Huang et al. |
| 7,544,639 B2 | 6/2009 | Pursley et al. |
| 7,547,665 B2 | 6/2009 | Welton et al. |
| 7,552,771 B2 | 6/2009 | Eoff et al. |
| 7,559,369 B2 | 7/2009 | Roddy et al. |
| 7,581,594 B2 | 9/2009 | Tang |
| 7,615,516 B2 | 11/2009 | Yang et al. |
| 7,621,334 B2 | 11/2009 | Welton et al. |
| 7,622,436 B2 | 11/2009 | Tuzi et al. |
| 7,655,603 B2 | 2/2010 | Crews |
| 7,677,311 B2 | 3/2010 | Abad et al. |
| 7,687,439 B2 | 3/2010 | Jones et al. |
| 7,709,421 B2 | 5/2010 | Jones et al. |
| 7,712,534 B2 | 5/2010 | Bryant et al. |
| 7,727,936 B2 | 6/2010 | Pauls et al. |
| 7,727,937 B2 | 6/2010 | Pauls et al. |
| 7,730,958 B2 | 6/2010 | Smith |
| 7,823,647 B2 | 11/2010 | Yang et al. |
| 7,825,073 B2 | 11/2010 | Welton et al. |
| 7,833,943 B2 | 11/2010 | Van Zanten et al. |
| 7,838,467 B2 | 11/2010 | Jones et al. |
| 7,846,877 B1 | 12/2010 | Robb |
| 7,851,414 B2 | 12/2010 | Yang et al. |
| 7,855,168 B2 | 12/2010 | Fuller et al. |
| 7,857,051 B2 | 12/2010 | Abad et al. |
| 7,886,824 B2 | 2/2011 | Kakadjian et al. |
| 7,893,010 B2 | 2/2011 | Ali et al. |
| 7,902,123 B2 | 3/2011 | Harrison et al. |
| 7,906,464 B2 | 3/2011 | Davidson |
| 7,910,524 B2 | 3/2011 | Welton et al. |
| 7,931,088 B2 | 4/2011 | Stegemoeller et al. |
| 7,960,314 B2 | 6/2011 | Van Zanten et al. |
| 7,960,315 B2 | 6/2011 | Welton et al. |
| 7,963,720 B2 | 6/2011 | Hoag et al. |
| 7,971,659 B2 | 7/2011 | Gatlin et al. |
| 7,976,241 B2 | 7/2011 | Hoag et al. |
| 7,989,404 B2 | 8/2011 | Kakadjian et al. |
| 7,992,656 B2 | 8/2011 | Dusterhoft et al. |
| 7,998,911 B1 | 8/2011 | Berger et al. |
| 8,043,996 B2 | 10/2011 | Harris |
| 8,053,396 B2 | 11/2011 | Huff et al. |
| 8,053,397 B2 | 11/2011 | Huang et al. |
| 8,057,682 B2 | 11/2011 | Hoag et al. |
| 8,091,644 B2 | 1/2012 | Clark et al. |
| 8,091,645 B2 | 1/2012 | Quintero et al. |
| 8,091,646 B2 | 1/2012 | Quintero et al. |
| 8,100,190 B2 | 1/2012 | Weaver et al. |
| 8,148,303 B2 | 4/2012 | Van Zanten et al. |
| 8,183,182 B2 | 5/2012 | Oliveira et al. |
| 8,206,062 B2 | 6/2012 | Hoag et al. |
| 8,207,096 B2 | 6/2012 | van Zanten et al. |
| 8,210,263 B2 | 7/2012 | Quintero et al. |
| 8,220,546 B2 | 7/2012 | Kakadjian et al. |
| 8,227,382 B2 | 7/2012 | Dakin et al. |
| 8,231,947 B2 | 7/2012 | Vaidya et al. |
| 8,235,120 B2 | 8/2012 | Quintero et al. |
| 8,242,059 B2 | 8/2012 | Sawdon |
| 8,293,687 B2 | 10/2012 | Giffin |
| 8,342,241 B2 | 1/2013 | Hartshorne et al. |
| 8,349,771 B2 | 1/2013 | Seth et al. |
| 8,356,667 B2 | 1/2013 | Quintero et al. |
| 8,357,639 B2 | 1/2013 | Quintero et al. |
| 8,372,789 B2 | 2/2013 | Harris et al. |
| 8,383,560 B2 | 2/2013 | Pich et al. |
| 8,403,051 B2 | 3/2013 | Huang et al. |
| 8,404,623 B2 | 3/2013 | Robb et al. |
| 8,413,721 B2 | 4/2013 | Welton et al. |
| 8,415,279 B2 | 4/2013 | Quintero et al. |
| 8,431,620 B2 | 4/2013 | Del Gaudio et al. |
| 8,453,741 B2 | 6/2013 | van Zanten |
| 8,499,832 B2 | 8/2013 | Crews et al. |
| 8,517,100 B2 | 8/2013 | Ali et al. |
| 8,517,104 B2 | 8/2013 | Kieffer |
| 8,524,643 B2 | 9/2013 | Huff et al. |
| 8,551,926 B2 | 10/2013 | Huang et al. |
| 8,592,350 B2 | 11/2013 | van Zanten et al. |
| 8,684,079 B2 | 4/2014 | Wattenbarger et al. |
| 8,778,850 B2 | 7/2014 | Andrecola |
| 8,865,632 B1 | 10/2014 | Parnell et al. |
| 2001/0007663 A1 | 7/2001 | Von Corswant |
| 2003/0022944 A1 | 1/2003 | Gumkowski et al. |
| 2003/0069143 A1 | 4/2003 | Collins |
| 2003/0166472 A1* | 9/2003 | Pursley .................. C09K 8/035 507/200 |
| 2003/0232095 A1 | 12/2003 | Garti et al. |
| 2005/0209107 A1 | 9/2005 | Pursley et al. |
| 2006/0014648 A1 | 1/2006 | Milson et al. |
| 2006/0211593 A1 | 9/2006 | Smith et al. |
| 2006/0223715 A1* | 10/2006 | Svoboda .................. C09K 8/32 507/265 |
| 2006/0258541 A1 | 11/2006 | Crews |
| 2007/0123445 A1 | 5/2007 | Tuzi et al. |
| 2007/0293404 A1 | 12/2007 | Hutchins et al. |
| 2007/0295368 A1 | 12/2007 | Harrison et al. |
| 2008/0274918 A1 | 11/2008 | Quintero et al. |
| 2008/0287324 A1 | 11/2008 | Pursley et al. |
| 2009/0078415 A1 | 3/2009 | Fan et al. |
| 2009/0088488 A1* | 4/2009 | Bruckner ................ C08G 18/42 521/110 |
| 2009/0137432 A1 | 5/2009 | Sullivan et al. |
| 2009/0159288 A1 | 6/2009 | Horvath Szabo et al. |
| 2009/0200027 A1 | 8/2009 | Kakadjian et al. |
| 2009/0221456 A1 | 9/2009 | Harrison et al. |
| 2009/0260819 A1 | 10/2009 | Kurian et al. |
| 2009/0275488 A1 | 11/2009 | Zamora et al. |

(56) References Cited

U.S. PATENT DOCUMENTS

| | | |
|---|---|---|
| 2009/0281004 A1 | 11/2009 | Ali et al. |
| 2010/0022421 A1 | 1/2010 | Gutierrez et al. |
| 2010/0173805 A1 | 7/2010 | Pomerleau |
| 2010/0216670 A1 | 8/2010 | Del Gaudio et al. |
| 2010/0243248 A1 | 9/2010 | Golomb et al. |
| 2010/0252267 A1 | 10/2010 | Harris et al. |
| 2010/0263863 A1 | 10/2010 | Quintero et al. |
| 2010/0272765 A1 | 10/2010 | Ho O et al. |
| 2010/0307757 A1 | 12/2010 | Blow et al. |
| 2011/0021386 A1 | 1/2011 | Ali et al. |
| 2011/0136706 A1 | 6/2011 | Carroll et al. |
| 2011/0146983 A1 | 6/2011 | Sawdon |
| 2011/0190174 A1 | 8/2011 | Weerasooriya et al. |
| 2011/0220353 A1 | 9/2011 | Bittner et al. |
| 2011/0237467 A1 | 9/2011 | Cornette et al. |
| 2011/0253365 A1 | 10/2011 | Crews et al. |
| 2011/0290491 A1 | 12/2011 | Gupta et al. |
| 2012/0004146 A1 | 1/2012 | Van Zanten et al. |
| 2012/0015852 A1 | 1/2012 | Quintero et al. |
| 2012/0035085 A1 | 2/2012 | Parnell et al. |
| 2012/0071366 A1* | 3/2012 | Falana .............. C09K 8/38 507/100 |
| 2012/0080232 A1 | 4/2012 | Muller et al. |
| 2012/0129738 A1 | 5/2012 | Gupta et al. |
| 2012/0149626 A1 | 6/2012 | Flick et al. |
| 2012/0168165 A1 | 7/2012 | Holcomb et al. |
| 2012/0181019 A1 | 7/2012 | Saini et al. |
| 2012/0193095 A1 | 8/2012 | Varadaraj et al. |
| 2012/0208726 A1 | 8/2012 | Smith et al. |
| 2012/0234548 A1 | 9/2012 | Dyer |
| 2012/0241155 A1 | 9/2012 | Ali et al. |
| 2012/0241220 A1 | 9/2012 | Quintero et al. |
| 2012/0255887 A1 | 10/2012 | Holms et al. |
| 2012/0261120 A1 | 10/2012 | Del Gaudio et al. |
| 2012/0285690 A1 | 11/2012 | Weaver et al. |
| 2012/0285694 A1 | 11/2012 | Morvan et al. |
| 2012/0318504 A1 | 12/2012 | Fan et al. |
| 2012/0318515 A1 | 12/2012 | Cawiezel et al. |
| 2012/0322697 A1 | 12/2012 | Zhang |
| 2012/0325492 A1 | 12/2012 | Fefer et al. |
| 2013/0029883 A1 | 1/2013 | Dismuke et al. |
| 2013/0048281 A1 | 2/2013 | Van Zanten et al. |
| 2013/0079255 A1 | 3/2013 | Del Gaudio et al. |
| 2013/0109597 A1 | 5/2013 | Sarkar et al. |
| 2013/0133886 A1 | 5/2013 | Quintero |
| 2013/0137611 A1 | 5/2013 | Pierce et al. |
| 2013/0146288 A1 | 6/2013 | Smith et al. |
| 2013/0146545 A1 | 6/2013 | Pabalan et al. |
| 2013/0153232 A1 | 6/2013 | Bobier et al. |
| 2013/0153234 A1 | 6/2013 | Bobier et al. |
| 2013/0192826 A1 | 8/2013 | Kurian et al. |
| 2013/0213659 A1* | 8/2013 | Luyster .............. C09K 8/528 166/312 |
| 2013/0233559 A1 | 9/2013 | van Zanten et al. |
| 2013/0244913 A1 | 9/2013 | Maberry et al. |
| 2013/0261033 A1 | 10/2013 | Nguyen |
| 2013/0292121 A1 | 11/2013 | Penny et al. |
| 2014/0005079 A1 | 1/2014 | Dahanayake et al. |
| 2014/0110344 A1 | 4/2014 | Hoag et al. |
| 2014/0202700 A1 | 7/2014 | Blair |
| 2014/0262261 A1 | 9/2014 | Hill et al. |
| 2014/0262274 A1 | 9/2014 | Dismuke et al. |
| 2014/0262288 A1 | 9/2014 | Penny et al. |
| 2014/0274817 A1 | 9/2014 | Hill et al. |
| 2014/0274822 A1 | 9/2014 | Dismuke et al. |
| 2014/0284053 A1 | 9/2014 | Germack et al. |
| 2014/0284057 A1 | 9/2014 | Champagne et al. |
| 2014/0299325 A1 | 10/2014 | Zelenev et al. |
| 2014/0332212 A1 | 11/2014 | Ayers et al. |
| 2014/0338911 A1 | 11/2014 | Dismuke et al. |
| 2014/0367107 A1 | 12/2014 | Hill et al. |
| 2014/0371115 A1 | 12/2014 | Hill et al. |
| 2015/0053404 A1 | 2/2015 | Penny et al. |
| 2016/0312106 A1 | 10/2016 | Penny et al. |

FOREIGN PATENT DOCUMENTS

| | | |
|---|---|---|
| CN | 102277143 | 12/2011 |
| CN | 103614128 | 3/2014 |
| CN | 103642477 | 3/2014 |
| EP | 1 051 237 B1 | 11/2003 |
| EP | 1 378 554 A1 | 1/2004 |
| EP | 1 786 879 B1 | 2/2012 |
| EP | 2 195 400 B1 | 8/2012 |
| EP | 1 880 081 B1 | 3/2013 |
| WO | WO 1999/049182 | 9/1999 |
| WO | WO 2005/048706 | 6/2005 |
| WO | WO 2007/011475 | 1/2007 |
| WO | WO 2008/141210 | 11/2008 |
| WO | WO2008/141210 | * 11/2008 |
| WO | WO2012/003356 | * 1/2012 |
| WO | WO 2012/158645 | 11/2012 |

OTHER PUBLICATIONS

International Search Report and Written Opinion from PCT/US2014/014271, dated May 13, 2014.

[No Author Listed], The HLB system: a time-saving guide to emulsifier selection. ICI Americas Inc. 1976. 22 pages.

[No Author Listed], Silwet L-77 Surfactant information sheet. Helena Chemical Company. 1998. Retrieved from the internet Apr. 15, 2014.

Adm, Evolution Chemicals E5789-117 Description. Jun. 2014.

Brost et al., Surfactants assist water-in-oil monitoring by fluroescence. World Oil. Oct. 2008;229(10).

Champagne et al., Critical assessment of microemulsion technology for enhancing fluid recovery from tight gas formations and propped fractures. SPE European Formation Damage Conference. Noordwijk, The Netherlands. Jun. 7-10. 2011. SPE-144095. 10 pages.

Crafton et al., Micro-emulsion effectiveness for twenty four wells, eastern green river, wyoming. 2009 SPE Rocky Mountain Petroleum Technology Conference. Denver, Colorado, USA, Apr. 14-16, 2009. SPE-123280. 13 pages.

Haw, The HLB system: a time saving guide to surfactant selection. Presentation to the Midwest chapter of the society of cosmetic chemists. Uniqema. Mar. 9, 2004. 39 slides.

Howard et al., Comparison of flowback aids: understanding their capillary pressure and wetting properties. SPE Production & Operations. Aug. 2010;:376-87.

Kunieda et al. Evaluation of hydrophile-lipophile balance (HLB) of nonionic surfactants. J Colloid and Interface Sci. Sep. 1985;107(1):107-21.

Yang et al., Optimizing nanoemulsions as fluid flowback additives in enhancing tight gas production. J Petroleum Sci Eng. 2014;121:122-5.

Zelenev et al., Microemulsion technology for improved fluid recovery and enhanced core permeability to gas. 2009 SPE European Formation Damage Conference. Scheveningen, The Netherlands. May 27-29. 2009. SPE 122109. 13 pages.

Zelenev et al., Microemulsion-assisted fluid recovery and improved permeability to gas in shale formations. 2010 SPE International Symposium and Exhibition on Formation Damage Control. Lafayette, Louisiana, USA. Feb. 10-12, 2010. SPE 127922. 7 pages.

Zelenev, Surface energy of north American shales and its role in interaction of shale with surfactants and microemulsions. SPE International Symposium on Oilfield Chemistry. The Woodlands, Texas, USA. Apr. 11-13, 2011. SPE-141459. 7 pages.

Extended European Search Report for EP 14774954.3 dated Oct. 19, 2016.

Kulkarni et al., Foams: Theory, Measurements, and Applications. Chapter 14: Science and Technology of Silicone Antifoams. Eds. Prud-homme, Khan. Marcel Dekker, Inc. New York, NY. 1996:555-85.

Lai et al., Foams: Theory, Measurements, and Applications. Excerpt from Chapter 8: Additives for Foams. Eds. Prud-homme, Khan. Marcel Dekker, Inc. New York, NY 1996:316-7.

(56) References Cited

OTHER PUBLICATIONS

Narsimhan et al., Foams: Theory, Measurements, and Applications. Excerpt from Chapter 1: Thing Liquid Film Physics. Eds. Prud-homme, Khan. Marcel Dekker, Inc. New York, NY 1996:100-101.
Sawicki, George C., High-Performance Antifoams for the Textile Dyeing Industry; Defoaming Theory and Industrial Applications, p. 193-216.

* cited by examiner

SILOXANE SURFACTANT ADDITIVES FOR OIL AND GAS APPLICATIONS

RELATED APPLICATIONS

This application is a continuation-in-part of U.S. patent application Ser. No. 13/831,410, filed Mar. 14, 2013, entitled "SILOXANE SURFACTANT ADDITIVES FOR OIL AND GAS APPLICATIONS", and this application is also a continuation in part of U.S. patent application Ser. No. 14/445,006, filed Jul. 28, 2014, entitled "SILOXANE SURFACTANT ADDITIVES FOR OIL AND GAS APPLICATIONS", which is a continuation-in-part of U.S. patent application Ser. No. 13/831,410, filed Mar. 14, 2013, entitled "SILOXANE SURFACTANT ADDITIVES FOR OIL AND GAS APPLICATIONS", each incorporated herein by reference in its entirety for all purposes.

FIELD OF THE INVENTION

The present invention generally relates to the production of petroleum and more particularly to compositions and processes for improving the recovery of petroleum from a subterranean geological formation.

BACKGROUND OF THE INVENTION

For many years, petroleum has been recovered from subterranean reservoirs through the use of drilled wells and production equipment. During the production of desirable hydrocarbons, such as crude oil and natural gas, a number of other naturally occurring substances may also be encountered within the subterranean environment.

The removal of unwanted deposits from the wellbore and production equipment is generally referred to as "remediation." In contrast, the term "stimulation" generally refers to the treatment of geological formations to improve the recovery of hydrocarbons. Common stimulation techniques include well fracturing and acidizing operations. Well remediation and stimulation are important services that are offered through a variety of techniques by a large number of companies.

Oil and natural gas are found in, and produced from, porous and permeable subterranean formations. The porosity and permeability of the formation determine its ability to store hydrocarbons, and the facility with which the hydrocarbons can be extracted from the formation.

The use of certain microemulsion additives during completion of both oil and gas wells leads to higher near wellbore permeability and long-term increased production of hydrocarbons from the well. The increased displacement of water from the formation and proppant by both oil and gas (flowback) and consequent increased production of hydrocarbons have been attributed to lowered capillary pressure. However, the solvent-hydrocarbon surfactant systems that have been used have limitations in their ability to lower capillary pressure. There is, therefore, a need for treatment compositions that are capable of lowering capillary pressure and increasing wettability while maintaining the desirable properties of conventional emulsified treatment formulations.

SUMMARY OF THE INVENTION

In some embodiments, a well treatment additive is provided comprising a foam, wherein the foam comprises an emulsion or microemulsion comprising a siloxane surfactant, a solvent, and an aqueous phase, and wherein the solvent is a terpene hydrocarbon.

In some embodiments, a method of treating a wellbore of an oil/and or gas is provided comprising injecting an additive into the wellbore, wherein the additive comprises an emulsion or microemulsion, wherein the emulsion or microemulsion comprises an siloxane surfactant, a solvent, and an aqueous phase, wherein the solvent comprises a terpene, and forming a foam from the emulsion or microemulsion prior to and/or during the injection of the additive into the wellbore.

In some embodiments, the present invention includes a well treatment additive that includes a siloxane surfactant, a solvent and an aqueous phase. The solvent is preferably a terpene hydrocarbon. The well treatment additive preferably is a spontaneously formed nanofluid with a nano-sized self-assembled liquid phase.

In some embodiment, siloxane surfactants (alone or in combination with conventional hydrocarbon surfactants) are used to form and enhance the properties of terpene solvent based nanofluid additives useful for the treatment of oil and gas wells.

In another aspect, methods of using the novel well treatment additives in a variety of well treatment processes are provided. Suitable well treatment processes include, but are not limited to, acidizing operations, hydraulic fracturing operations, well remediation operations and water removal operations.

DETAILED DESCRIPTION OF PREFERRED EMBODIMENTS

Figure 1:
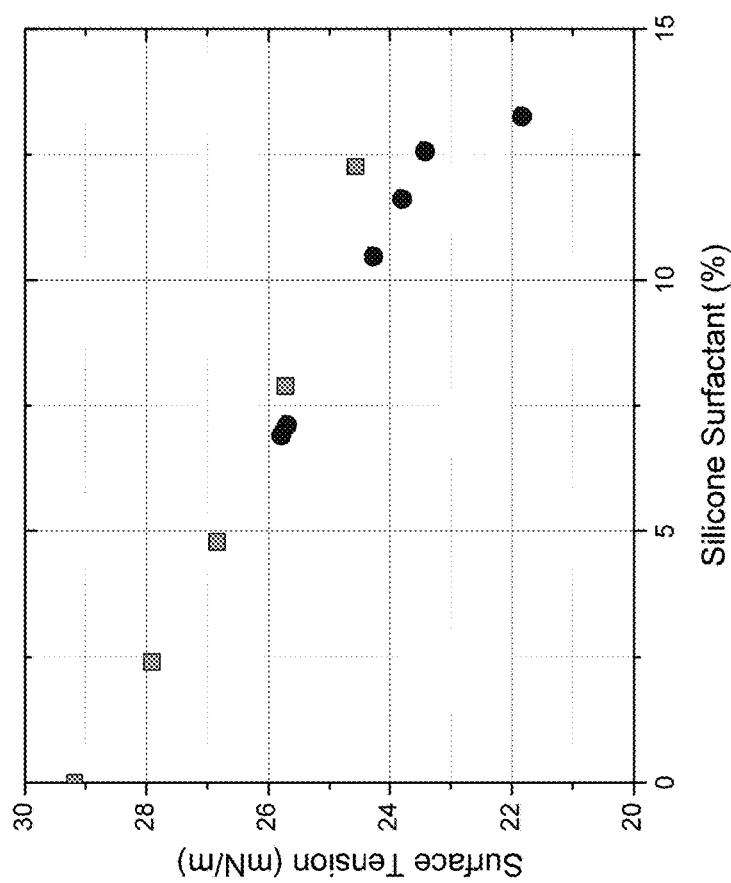
FIG. 1 provides a graph of the surface tension of 2 gpt dispersions of siloxane surfactant containing microemulsion formulations. The squares represent formulations containing a higher level of terpene solvent while the circles represent formulations with a lower level of terpene solvent.

Presently preferred embodiments generally contemplate the preparation of an additive for use in oil and gas wells. The additive preferably includes a solvent component, a surfactant component and an aqueous phase. In some embodiments, nano-sized particles of the solvent component are distributed within the aqueous phase. In certain embodiments, the additive comprises an emulsion or microemulsion. In some embodiments, the additive forms a stable foam. Other functional materials may also be included advantageously.

Generally, the additive is prepared using a siloxane surfactant, a solvent and an aqueous phase. In some embodiments, the solvent is a terpene and the surfactant includes a combination of a siloxane surfactant and a hydrocarbon surfactant of a kind, amount and proportion effective to form a stable distribution of the nanosized particles of terpene solvent within the aqueous phase. In certain embodiments, the solvent is a terpene and the surfactant includes a combination of a siloxane surfactant and an alcohol. Each of these components is discussed separately below.

In some embodiments, additives comprising an emulsion or microemulsion are provided. The terms should be understood to include emulsions or microemulsions that have a water continuous phase, or that have an oil continuous phase, or microemulsions that are bicontinuous or multiple continuous phases of water and oil. In certain embodiments, the additive comprising an emulsion or microemulsion forms a stable foam.

As used herein, the term emulsion is given its ordinary meaning in the art and refers to dispersions of one immiscible liquid in another, in the form of droplets, with diameters approximately in the range of 100-1,000 nanometers. Emulsions may be thermodynamically unstable and/or require high shear forces to induce their formation.

As used herein, the term microemulsion is given its ordinary meaning in the art and refers to dispersions of one immiscible liquid in another, in the form of droplets, with diameters approximately in the range of about between about 1 and about 1000 nm, or between 10 and about 1000 nanometers, or between about 10 and about 500 nm, or between about 10 and about 300 nm, or between about 10 and about 100 nm. Microemulsions are clear or transparent because they contain particles smaller than the wavelength of visible light. In addition, microemulsions are homogeneous thermodynamically stable single phases, and form spontaneously, and thus, differ markedly from thermodynamically unstable emulsions, which generally depend upon intense mixing energy for their formation. Microemulsions may be characterized by a variety of advantageous properties including, by not limited to, (i) clarity, (ii) very small particle size, (iii) ultra-low interfacial tensions, (iv) the ability to combine properties of water and oil in a single homogeneous fluid, (v) shelf life stability, and (vi) ease of preparation.

In some embodiments, the microemulsions described herein are stabilized microemulsions that are formed by the combination of a solvent-surfactant blend with an appropriate oil-based or water-based carrier fluid. Generally, the microemulsion forms upon simple mixing of the components without the need for high shearing generally required in the formation of ordinary emulsions. In some embodiments, the microemulsion is a thermodynamically stable system, and the droplets remain finely dispersed over time. In some cases, the average droplet size ranges from about 10 nm to about 300 nm.

It should be understood, that while much of the description herein focuses on microemulsions, this is by no means limiting, and emulsions may be employed where appropriate.

In some embodiments, the emulsion or microemulsion is a single emulsion or microemulsion. For example, the emulsion or microemulsion comprises a single layer of a surfactant. In other embodiments, the emulsion or microemulsion may be a double or multilamellar emulsion or microemulsion. For example, the emulsion or microemulsion comprises two or more layers of a surfactant. In some embodiments, the emulsion or microemulsion comprises a single layer of surfactant surrounding a core (e.g., one or more of water, oil, solvent, and/or other additives) or a multiple layers of surfactant (e.g., two or more concentric layers surrounding the core). In certain embodiments, the emulsion or microemulsion comprises two or more immiscible cores (e.g., one or more of water, oil, solvent, and/or other additives which have equal or about equal affinities for the surfactant).

In some embodiments, a microemulsion comprises water, a solvent, and a surfactant. In some embodiments, the microemulsion further comprises additional components, for example, a freezing point depression agent or an alcohol. Details of each of the components of the microemulsions are described in detail herein. In some embodiments, the components of the microemulsions are selected so as to reduce or eliminate the hazards of the microemulsion to the environment and/or the subterranean reservoirs.

In some embodiments, the emulsion or microemulsion comprise between about 3 wt % and about 50 wt % solvent (e.g., a terpene), between about 10 wt % and about 70 wt % surfactant (e.g., a siloxane surfactant), and between about 5 wt % and about 45 wt % a co-solvent. In certain embodiments, the solvent is present in the emulsion or microemulsion in an amount between about 5 wt % and about 35 wt %, or between about 7 wt % and about 27 wt %. In some embodiments, the surfactant is present in the emulsion or microemulsion in an amount between about 15 wt % and about 60 wt %, or between about 20 wt % and about 50 wt %. In certain embodiments, the co-solvent is present in the emulsion or microemulsion in an amount between about 5 wt % and about 35 wt %, or between about 5 wt % and about 20 wt %. In some embodiments, the co-solvent is an alcohol. In some embodiments, the co-solvent is selected from the group consisting of methanol, ethanol, isopropyl alcohol, ethylene glycol, propylene glycol, dipropylene glycol monomethyl ether, triethylene glycol, ethylene glycol monobutyl ether, and combinations thereof.

In some embodiments, the emulsion or microemulsion is as described in U.S. Pat. No. 7,380,606, entitled "Composition and Process for Well Cleaning", or in U.S. patent application Ser. No. 14/212,763, filed Mar. 14, 2014, and entitled "Methods and Compositions for use in Oil and/or Gas Wells", each herein incorporated by reference.

As used herein, the term "siloxane surfactant" refers to permethylated siloxane materials functionalized with a sufficient number of polar groups so as to render them usefully surface active in aqueous mixtures. Thus, these siloxane surfactants qualify as amphiphiles in which a hydrophobic silicone group is coupled with one or more hydrophilic groups. They may be, in some cases, co-polymers, or molecules comparable in molecular weight to conventional organic surfactants such as heptaethylene glycol monododecyl ether.

To facilitate description of preferred siloxane surfactants, it is helpful to use the MDTQ notation for siloxane copolymers adopted in U.S. Pat. No. 3,299,112 issued Jan. 17, 1967 to Bailey, and summarized in Table 1 below:

TABLE 1

| MDTQ Notation for Siloxane Building Block Units | | |
| --- | --- | --- |
| M | $Me_3SiO_{1/2}$— | A trimethyl end-cap unit |
| D | —$Me_2SiO$— | The basic dimethyl unit |
| T | —$MeSiO_{3/2}$— | A three-way branch point unit |
| Q | —$SiO_2$— | A four-way branch point unit |
| M' | $Me_2(R)SiO_{1/2}$— | A substituted trifunctional end-cap unit |
| D' | —$Me(R)SiO$— | A substituted difunctional unit |
| T' | —$RSiO_{3/2}$— | A substituted three-way branch point unit |
| Me | —$CH_3$ | A methyl group |
| R | H, or | (after hydrosilylation) some non-methyl organic group such as —$CH_2CH_2CH_2(OCH_2CH_2)_nOH$ |

It should be noted that while an organic radical, R, is implicit in the M'D'T' notation, the R group is shown in the structures given below to permit a more detailed disclosure of the range of non-limiting structures of R groups useful within the siloxane surfactant component.

In presently preferred embodiments, the siloxane surfactant component is an organosilicon compound having a formula selected from the group consisting of one of the formulas identified in Table 2 below:

| | | |
|---|---|---|
| 1. | $MD_a(D'R^1)_bM$ | a graft-type copolymer |
| 2. | $(M'R^1)D_a(M'R^1)$ | an ABA-type copolymer |
| 3. | $(M'R^1)D_a(M'R^2)$ | an AB-type copolymer |
| 4. | $(M'R^1)D_a(D'R^1)_b(M'R^1)$ | a hybrid graft-type, ABA-type copolymer |
| 5. | $T_z(T'R^1)_c$ | a silsesquioxane cage structure |
| 6. | $(M'R^1)_tM_uQ_v$ | a functionalized MQ silicone resin |
| 7. | $[(D'R^1)D_k]$ | a cyclic siloxane (the square brackets denote a cyclic structure) | where $R^1$ represents an organic radical comprising $-(CH_2)_n-(OCH_2CH_2)_x-(OCH(CH_3)CH_2)_y-OR^3$, in which n = 3 to about 11, x = 3 to about 30, y = 0 to about 30, and $R^3$ may be —H, —Me, or —C(O)CH$_3$.

For formula 1, a is 0-200, and b is 1-20. The case for which a=0 and b=1 represents the heptamethyltrisiloxane surfactants. Suitable examples are available from Dow Corning Corporation as Dow Corning® Q2-5211 Superwetting Agent, or from Momentive™ as Silwet L-77. For formula 2, a is 4-50. A suitable example available from Dow Corning Corporation is Dow Corning® 2-8692 Fluid. For formula 3, a is 0-25, and $R^2$ represents an alkane radical of 1-8 carbon atoms. For formula 4, a is 0-200, and b is 1-20. For formula 5, the ratio of c:z is 1:7 to 2:6, and the total molecular weight should be less than 7000 Daltons. For formula 6, the ratio of (t+u):v is from 0.4:1 to 2:1 and the ratio of t:u is from 1:4 to 1:1, and the total molecular weight should be less than 7000 Daltons. For formula 7, k is 4-5.

In some embodiments, the surfactant comprises an alkoxylated siloxane surfactant. In some embodiments, the siloxane comprises a plurality of ethylene oxide and/or propylene oxide groups. For example, in some embodiments, the surfactant is an AB-type copolymer comprising the structure as in formula 8:

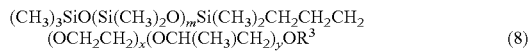

(e.g., $MD_nM'R^1$ in the MDTQ notation) wherein $R^3$ is H, —CH$_3$, or —C(O)CH$_3$, m is 1-4, x is 4-12, and y is 0-2.

In certain embodiments, the surfactant is an ABA-type copolymer comprising the structure as in formula 9:

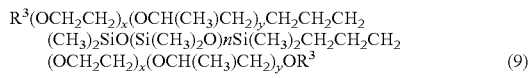

(e.g., $R^1M'D_nM'R^1$ in the MDTQ notation) wherein each $R^3$ is independently H, —CH$_3$, or —C(O)CH$_3$, n is 2-4, each x is independently 4-12, and each y is independently 0-2.

In some embodiments, the surfactant is a functionalized cyclosiloxane comprising the structure as in formula 10:

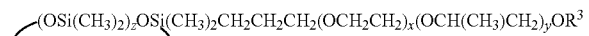

(e.g., $D_aD'R^1$ in the MDTQ notation) wherein $R^3$ is H, —CH$_3$, or —C(O)CH$_3$, z is 3 (e.g., a cyclic tetramer) or 4 (e.g., a cyclic pentamer), x is 4-12, and y is 0-2.

Other non-limiting cyclic siloxanes will be known in the art, for examples, those described in U.S. Pat. No. 3,299,112, entitled "Siloxane Wetting Agents", filed Jun. 19, 1964, and U.S. Pat. No. 3,562,786, entitled "Organosilicon-surfactant compositions," filed Nov. 9, 1966, each herein incorporated by reference.

In certain embodiments, the siloxane surfactant is an alkoxylated trisiloxane surfactant. In some embodiments, the siloxane surfactant of formula 8, 9, or 10 has a molecular weight of between about 350 Daltons and about 2000 Daltons. In certain embodiments, the siloxane surfactant of formula 8, 9, or 10 has a molecular weight of less than or equal to about 2000 Daltons, less than or equal to about 1500 Daltons, less than or equal to about 1000 Daltons, less than or equal to about 500 Daltons, or less than or equal to about 400 Daltons. In some embodiments, the siloxane surfactant of formula 8, 9, or 10 has a molecular weight of greater than about 350 Daltons, greater than about 500 Daltons, greater than about 1000 Daltons, or greater than about 1500 Daltons. Combinations of the above-referenced ranges are also possible (e.g., between about 350 Daltons and about 2000 Daltons, between about 500 Daltons and about 2000 Daltons, or between about 700 Daltons and about 2000 Daltons). Other molecular weights are also possible.

Suitable hydrocarbon surfactants include a multiplicity of surface active agents which are expediently classified into nonionic, anionic, cationic and amphoteric surface-active agents. An overview is cited in Ullmanns Encyklopadie der technischen Chemie [Ullmanns Encyclopedia of Industrial Chemistry], Verlag Chemie Weinheim, 4th Edition 1975, Volume 10, pp. 449-473.

In some embodiments, the additive comprises one or more surfactants (e.g., in addition to the siloxane surfactant; e.g., a first surfactant and a second surfactant). Non-limiting examples of suitable surfactants include nonionic surfactants, cationic surfactants, anionic surfactants, zwitterionic surfactants, or combinations thereof. Surfactants in general are wetting agents that lower the surface tension of a liquid in which they are dissolved, allowing easier spreading and decreasing the interfacial tension between two liquids. Each surfactant has a hydrophilic head that is attracted to water molecules and a hydrophobic tail that repels water and attaches itself to hydrophobic materials such as oil and grease.

In certain embodiments, the additive comprises a nonionic surfactant. In this context, a nonionic surfactant has an uncharged hydrophilic head and a hydrophobic tail comprising a carbon chain. Examples of nonionic surfactants suitable for use in this disclosure include without limitation linear alcohol ethoxylates, polyoxyethylene alkylphenol ethoxylates, polyoxyethylene alcohol ethoxylates, polyoxyethylene esters of fatty acids, polyoxyethylene alkylamines, alkyl polyglucosides, ethylene oxide-propylene oxide copolymers or a combination thereof. In some cases, nonionic surfactants may have a carbon chain length of 8-20 carbon atoms and 3-40 ethylene oxide units, up to 40 propylene oxide units, up to 2 glucose units or a combination thereof.

In some embodiments, the nonionic surfactant may be present in the additive in an amount of from about 5 wt. % to about 70 wt. % based on the total weight of the additive, or from about 10 wt. % to about 70 wt. %, or from about 20 wt. % to about 40 wt. %.

In certain embodiments, the additive comprises an anionic surfactant. In this context, an anionic surfactant has a negatively charged head and a hydrophobic tail comprising a carbon chain. Examples of anionic surfactants suitable for use in this disclosure include without limitation sodium salts of fatty acids, alkyl sulphates, alkyl ethoxylate sulphates or sulfonates, or a combination thereof. In some cases, anionic surfactants may have a carbon chain length of 8-20 carbon atoms.

In some embodiments, the additive comprises a cationic surfactant. In this context, a cationic surfactant has a positively charged head and a hydrophobic tail comprising a carbon chain. Examples of cationic surfactants suitable for use in this disclosure include without limitation quaternary ammonium salts, ethoxylated quaternary ammonium salts, or a combination thereof. In some cases, the cationic surfactant may have a carbon chain length of 8-20 carbon atoms.

In certain embodiments, the additive comprises a zwitterionic surfactant. Zwitterionic surfactants are electrically neutral surfactants that carry both a formal positive and a formal negative charge on different atoms in the same molecule. Examples of zwitterionic surfactants suitable for use in this disclosure include without limitation alkyl amine oxides, alkyl betaines, alkyl amidopropyl betaine, alkyl sulfobetaines, alkyl sultaines, or combinations thereof. In some cases, the zwitterionic surfactant may have a carbon chain length of 8-20 carbon atoms.

Surfactants can be described in terms of their hydrophile-lipophile balance (HLB) numbers, or silicone HLB (SHLB) numbers for siloxane surfactants, but the formulation of a microemulsion generally requires that the surfactant system be matched to, and optimized for the particular oil or solvent in use. It has been determined that the best procedure for selecting and optimizing a surfactant system, in some embodiments, is to map the phase behavior and select the system that gives the desired stability over a wide range of temperatures.

Other non-limiting surfactants will be known in the art, for examples, those described in U.S. Pat. No. 7,380,606, entitled "Composition and Process for Well Cleaning", and in U.S. patent application Ser. No. 14/212,763, filed Mar. 14, 2014, and entitled "Methods and Compositions for use in Oil and/or Gas Wells", each herein incorporated by reference.

In some embodiments, the solvent component may be selected from the class of solvents referred to as terpenes, including those derived from citrus and from pine sources. Terpene solvents are natural products, whose structures are built up from isoprene units. In some embodiments, at least one of the solvents present in the microemulsion is a terpene or a terpenoid. In some embodiments, the terpene or terpenoid comprises a first type of terpene or terpenoid and a second type of terpene or terpenoid. A dimer consisting of two isoprene units is termed a monoterpene. They can be acyclic or cyclic. The broader term "terpenoids" also covers natural and synthetic derivatives such as alcohols, aldehydes, ketones, and ethers. In certain embodiments, terpenes include cyclic and acyclic monoterpenoids, including but not limited to those that are good solvents for paraffins and asphaltenes.

Terpenes may be generally classified as monoterpenes (e.g., having two isoprene units), sesquiterpenes (e.g., having 3 isoprene units), diterpenes, or the like. The term terpenoid also includes natural degradation products, such as ionones, and natural and synthetic derivatives, e.g., terpene alcohols, aldehydes, ketones, acids, esters, epoxides, and hydrogenation products (e.g., see Ullmann's Encyclopedia of Industrial Chemistry, 2012, pages 29-45, herein incorporated by reference). It should be understood, that while much of the description herein focuses on terpenes, this is by no means limiting, and terpenoids may be employed where appropriate. In some cases, the terpene is a naturally occurring terpene. In some cases, the terpene is a non-naturally occurring terpene and/or a chemically modified terpene (e.g., saturated terpene, terpene amine, fluorinated terpene, or silylated terpene).

In some embodiments, the terpene is a monoterpene. Monoterpenes may be further classified as acyclic, monocyclic, and bicyclic, as well as whether the monoterpene comprises one or more oxygen atoms (e.g., alcohol groups, ester groups, carbonyl groups, etc.). In some embodiments, the terpene is an oxygenated terpene, for example, a terpene comprising an alcohol, an aldehyde, and/or a ketone group. In some embodiments, the terpene comprises an alcohol group. Non-limiting examples of terpenes comprising an alcohol group are linalool, geraniol, nopol, α-terpineol, and menthol. In some embodiments, the terpene comprises an ether-oxygen, for example, eucalyptol, or a carbonyl oxygen, for example, menthone. In some embodiments, the terpene does not comprise an oxygen atom, for example, d-limonene.

Non-limiting examples of terpenes include linalool, geraniol, nopol, α-terpineol, menthol, eucalyptol, menthone, d-limonene, terpinolene, β-occimene, γ-terpinene, α-pinene, and citronellene. In a particular embodiment, the terpene is selected from the group consisting of α-terpineol, α-pinene, nopol, and eucalyptol. In one embodiment, the terpene is nopol. In another embodiment, the terpene is eucalyptol. In some embodiments, the terpene is not limonene (e.g., d-limonene). In some embodiments, the emulsion is free of limonene.

In some embodiments, the terpene is a non-naturally occurring terpene and/or a chemically modified terpene (e.g., saturated terpene). In some cases, the terpene is a partially or fully saturated terpene (e.g., p-menthane, pinane). In some cases, the terpene is a non-naturally occurring terpene. Non-limiting examples of non-naturally occurring terpenes include, menthene, p-cymene, r-carvone, terpinenes (e.g., alpha-terpinenes, beta-terpinenes, gamma-terpinenes), dipentenes, terpinolenes, borneol, alpha-terpinamine, and pine oils.

Those of ordinary skill in the art will be aware of solvents other than terpenes to use with the additives described herein. Other non-limiting solvents will be known in the art, for examples, those described in U.S. Pat. No. 7,380,606, entitled "Composition and Process for Well Cleaning", and in U.S. patent application Ser. No. 14/212,763, filed Mar. 14, 2014, and entitled "Methods and Compositions for use in Oil and/or Gas Wells", each herein incorporated by reference.

The emulsion or microemulsion may comprise a co-solvent or a mixture of co-solvents. Co-solvents may, in some cases, increase the usefulness of emulsion or microemulsion, especially freeze stability. Non-limiting examples of co-solvents include short chain alkyl alcohols and glycols and combinations thereof. In some embodiments, the co-solvents comprise methanol, ethanol, isopropanol, 1,2-pentanediol, propylene glycol, and triethylene glycol and/or combinations thereof.

In some embodiments, the co-solvent may be present in the additive in an amount of from about 5 wt. % to about 70 wt. % based on the total weight of the additive, more preferably from about 10 wt. % to about 70 wt. %, and even more preferably from about 20 wt. % to about 40 wt. %. Alternatively, the co-solvents are incorporated into the additive to provide a formulation that is clear and stable over a temperature range from −25 degrees F. to 150 degrees F.

Generally, the microemulsion comprises an aqueous phase. Generally, the aqueous phase comprises water. The water may be provided from any suitable source (e.g., sea water, fresh water, deionized water, reverse osmosis water, water from field production). The water may be present in any suitable amount. In some embodiments, the total amount of water present in the microemulsion is between about 1 wt % about 95 wt %, or between about 1 wt % about 90 wt %, or between about 1 wt % and about 60 wt %, or between about 5 wt % and about 60 wt % or between about 10 and about 55 wt %, or between about 15 and about 45 wt %, versus the total microemulsion composition.

The water to solvent ratio in a microemulsion may be varied. In some embodiments, the ratio of water to solvent, along with other parameters of the solvent may be varied. In some embodiments, the ratio of water to solvent by weight is between about 15:1 and 1:10, or between 9:1 and 1:4, or between 3.2:1 and 1:4.

Any suitable method for injecting the additive (e.g., emulsion or microemulsion) into a wellbore may be employed. For example, in some embodiments, the additive may be injected into a subterranean formation by injecting it into a well or wellbore in the zone of interest of the formation and thereafter pressurizing it into the formation for the selected distance. Methods for achieving the placement of a selected quantity of a mixture in a subterranean formation are known in the art. The well may be treated with the microemulsion for a suitable period of time. The microemulsion and/or other fluids may be removed from the well using known techniques, including producing the well.

It should be understood, that in embodiments where an additive is said to be injected into a wellbore, that the additive may be diluted and/or combined with other liquid component(s) prior to and/or during injection (e.g., via straight tubing, via coiled tubing, etc.). For example, in some embodiments, the additive is diluted with an aqueous carrier fluid (e.g., water, brine, sea water, fresh water, or a well-treatment fluid (e.g., an acid, a fracturing fluid comprising polymers, produced water, sand, slickwater, etc.,)) prior to and/or during injection into the wellbore. In some embodiments, a composition for injecting into a wellbore is provided comprising an additive as described herein and an aqueous carrier fluid, wherein the microemulsion is present in an amount between about 0.1 and about 50 gallons per thousand gallons (gpt) per dilution fluid, or between 0.1 and about 100 gpt, or between about 0.5 and about 10 gpt, or between about 0.5 and about 2 gpt.

In some embodiments, the additive is utilized as a form. In some embodiments, the additive comprises an emulsion or microemulsion in the form of a foam. In some embodiments, the emulsions or microemulsions described herein are used to generate the foam.

Generally, oil recovered from oil bearing earth formations is usually first produced by the inherent formation pressure of the oil bearing earth formations. In some cases, however, the oil bearing formation lacks sufficient inherent pressure to force the oil from the formation upward to the surface. In other cases, the inherent pressure of an oil-bearing formation can be expended prior to the recovery of all of the recoverable oil so that when the pressure of the production zone has been reduced by continued withdrawal, where the well may stop flowing. In such cases, artificial methods of lifting the oil from the formation to the surface are usually employed. For example, foam may be used, in some embodiments, to increase the viscosity of the gas phase of a gas flooding operation or an immiscible gas flooding operation which provides lift and enhances production of liquid hydrocarbon from the well. Foam may also be used, in some cases, to divert flow from a highly swept (or high permeability zone) to a less swept (or lower permeability) zone thus increasing the efficacy of pushing the crude oil towards a production well. Foam may also be used, in some cases, to energize fracturing operations and carry proppant during a fracturing operation.

However, maintaining foam in an oil formation is difficult because crude oil is a known defoamer and may inhibit, diminish, or completely eliminate the foam generated by most hydrocarbon surfactants. In addition, siloxane materials (e.g., siloxane surfactants) are typically used as defoamers. The inventors unexpectedly discovered that a certain class of alkoxylated siloxane surfactants, as described above, are capable of stabilizing a foam in the presence of crude oil.

In some embodiments, the foam comprises an emulsion or microemulsion as described herein. For example, in certain embodiments, the foam comprises water, a solvent (e.g., a terpene), and a surfactant (e.g., an alkoxylated siloxane surfactant). In some embodiments, the foam further comprises additional components, for example, a freezing point depression agent or a co-solvent (e.g., an alcohol).

In some embodiments, an emulsion or a microemulsion described herein (e.g., comprising an alkoxylated siloxane surfactant) forms a foam upon contact with gas (e.g., carbon dioxide, flu gas, methane, natural gas, or nitrogen) and is injected into a formation (e.g., in an aqueous treatment fluid or injected into the gas stream). In certain embodiments, the emulsion or microemulsion described herein (e.g., comprising an alkoxylated siloxane surfactant) forms a foam upon contact with gas (e.g., carbon dioxide or nitrogen) and is injected into the formation to divert gas flow from high permeability zones to low permeability zones during a gas flood enhanced oil recovery (IOR or EOR) treatments. In some embodiments, an emulsion and/or microemulsion is injected into the formation as a preflush to prepare the formation for the foam injection. The injection of the foam comprising an alkoxylated siloxane surfactant may have many advantages as compared to the injection of a foam not comprising an alkoxylated siloxane surfactant, including enhancing the stability of the foam (e.g., by preventing the breakdown of the foam by crude oil), and/or increasing the penetration of the foam into the formation (e.g., by increasing the volume of the foam formed).

Methods for using and generating foam will be generally known in the art. For example, a fluid comprising an additive (e.g., an emulsion or microemulsion) may further comprise at least one gas (e.g., nitrogen gas, carbon dioxide). In some embodiments, a foam may be formed by combining an additive (e.g., an emulsion or microemulsion) with a gas (e.g., nitrogen gas, carbon dioxide). In some embodiments, the foam is generated prior to injection of the material into a wellbore. In certain embodiments, as described above, the foam is generated from an emulsion or microemulsion during and/or after injection into a wellbore.

A series of laboratory tests confirms the superior effectiveness of the additives incorporating siloxane surfactants. It has been determined that mixtures of siloxane surfactants and hydrocarbon surfactants, in some embodiments, can markedly lower surface tension to values not achievable by the hydrocarbon surfactants alone. In addition, and unexpectedly since silicone materials are usually regarded as incompatible with hydrocarbon materials, the additives of in some embodiments have been found to exhibit improved aqueous phase (brine) displacement by crude oil or gas.

Within these laboratory tests, a first series of additives was prepared using a siloxane surfactant, a co-solvent, aqueous phase and a terpene solvent. A second series of additives was prepared using a siloxane surfactant, a hydrocarbon surfactant, a co-solvent, an aqueous phase and a terpene solvent. The following examples provide performance characteristics for the first and second series of additives.

Example 1

A transparent low-viscosity mixture that exhibited the characteristic properties of a microemulsion was prepared using 60% by weight of a 1:1 blend of Dow Corning Xiameter® OFX-0190 Fluid (siloxane surfactant) and isopropyl alcohol (co-solvent), 30% by weight of water (aqueous phase), and 10% by weight of technical grade d-limonene (terpene solvent). This mixture was identified as a microemulsion based on the spontaneous formation with minimal mechanical energy input to form a transparent dispersion from an immiscible mixture of water and d-limonene upon addition of an appropriate amount of surfactant and co-solvent. These and other salient characteristics identifying a mixture as a spontaneously formed microemulsion are well known to practitioners in the art.

The order of mixing of this and other compositions described in this disclosure is not critical, but for convenience during the laboratory tests, the additives were prepared using a procedure in which a mixture of the surfactant and the isopropyl alcohol was first prepared and then combined with a mixture of the technical grade d-limonene and water. With small samples in the laboratory, a few seconds of gentle mixing yielded a transparent dispersion. It will be understood by experts on liquid mixing that longer times are required in the large vessels used in full-scale commercial manufacturing.

Example 2

A transparent low-viscosity additive was prepared using 30% by weight of a 1:1 blend of Dow Corning® 5211 Superwetting Agent (siloxane surfactant) an isopropyl alcohol (co-solvent), 60% by weight of water (aqueous phase), and 10% by weight of technical grade d-limonene (terpene solvent).

Example 3

A transparent low-viscosity additive was prepared using about 61% by weight of a blend of a detergent range alcohol ethoxylate surfactant, an ethoxylated castor oil surfactant, isopropyl alcohol and glycol co-solvent, about 2% by weight of Momentive™ Silwet L-77 siloxane surfactant, 15% by weight of water, and 22% by weight of technical grade d-limonene. This is the formulation referenced as Formulation 3B below. Additional transparent low-viscosity additives were prepared increasing the siloxane surfactant up to 12% by weight of Momentive™ Silwet L-77 (and 51% by weight of the other surfactant/co-solvent components). This is the formulation designated as 4B below.

Example 4

A transparent low-viscosity additive was prepared using about 41% by weight of a blend of a detergent range alcohol ethoxylate surfactant, an ethoxylated castor oil surfactant, isopropyl alcohol and glycol co-solvent, about 12% by weight of Momentive™ Silwet L-77 siloxane surfactant, 41% by weight of water, and 6% by weight of technical grade d-limonene. Several additional formulations similar to this were prepared with varying amounts of siloxane surfactant. These are the microemulsion formulations shown in FIG. 1 with a lower level of terpene solvent.

To characterize the interfacial and performance characteristics of these additives, 2 gallons per thousand (gpt) dilutions were prepared. The surface tension of the 2 gpt dilution was measured using a properly calibrated Kruss K100 tensiometer. The surface tension results for the formulations described under Example 3 are shown in FIG. 1. As FIG. 1 demonstrates, incorporation of the siloxane surfactant into these microemulsion formulations produced a progressive decrease in the surface tension, ultimately reaching values below 22 mN/m—much lower than common hydrocarbon surfactants, which typically give surface tension values greater than 28 mN/m.

Contact angles of 2 gpt dilutions were measured on dry-polished shale core samples from the Niobrara formation. For commercially available microemulsion products, initial contact angle values for 2 gpt dilutions are around 30-40 degrees with rapid relaxation to stable values of 9-15 degrees within 30 seconds. For the formulations shown in FIG. 1, all except the 0% siloxane surfactant gave contact angles of zero degrees (hence complete wetting) after 6-20 seconds. This demonstrates the remarkable ability of the microemulsion incorporating this siloxane surfactant to produce complete wetting of mixed-wet formation rock surfaces even for small proportions of the siloxane surfactant in the formulation. Decreasing the contact angle from 9 degrees to zero degrees increases the capillary pressure slightly, but even a small decrease in the surface tension from 29 to 28 mN/m more than offsets this slight increase (assuming a 10 micron pore diameter, capillary pressure Pc=0.831 psi for a surface tension of 29 mN/m and contact angle of 9 degrees, and Pc=0.812 psi for 28 mN/m and zero degrees). Thus the combination of surface tension lowering and increased wetting would be expected to lead to an increase in near wellbore conductivity.

Figure 2:
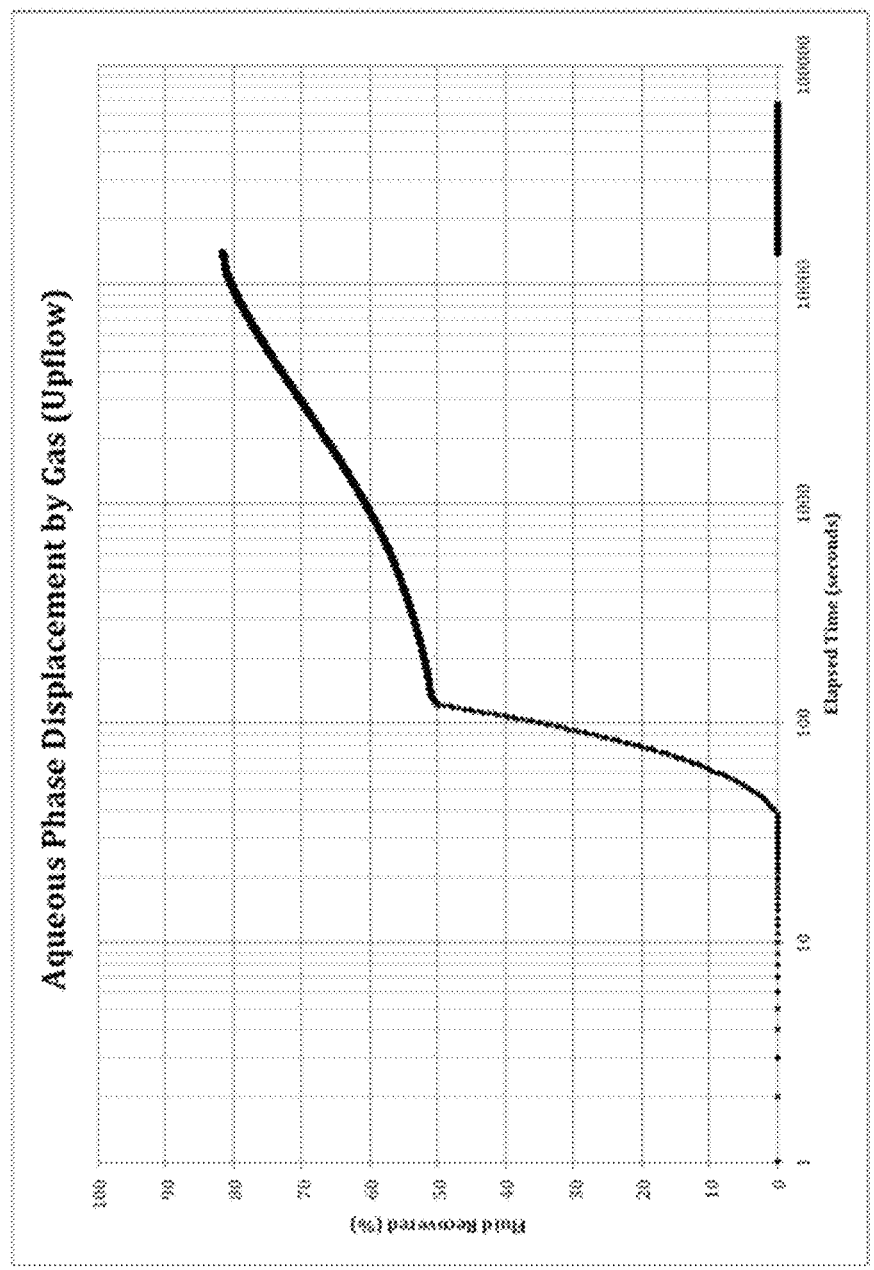
FIG. 2 provides a graph of the aqueous phase displacement by gas for a siloxane surfactant additive during an upflow experiment using 20/40 mesh Ottawa sand.

FIG. 2 shows the efficacy of one of the low terpene solvent formulations from FIG. 1 in promoting brine displacement by gas. A 2 gpt dispersion of this formulation gave a surface tension of 25.8 mN/m.

Surface tensions of the 2 gpt dispersions were measured before and after they passed through the sand pack to determine how much of the surfactant was lost to adsorption during the experiment. An increase of surface tension of 1-3 mN/m was typically observed. In the case of the formulation shown in FIG. 2 the increase was <1 mN/m. In comparison, a surfactant package widely used in the oilfield exhibited an increase in surface tension of >20 mN/m, often up to 40 mN/m (representing essentially complete loss of all surfactant due to adsorption).

Figure 3:
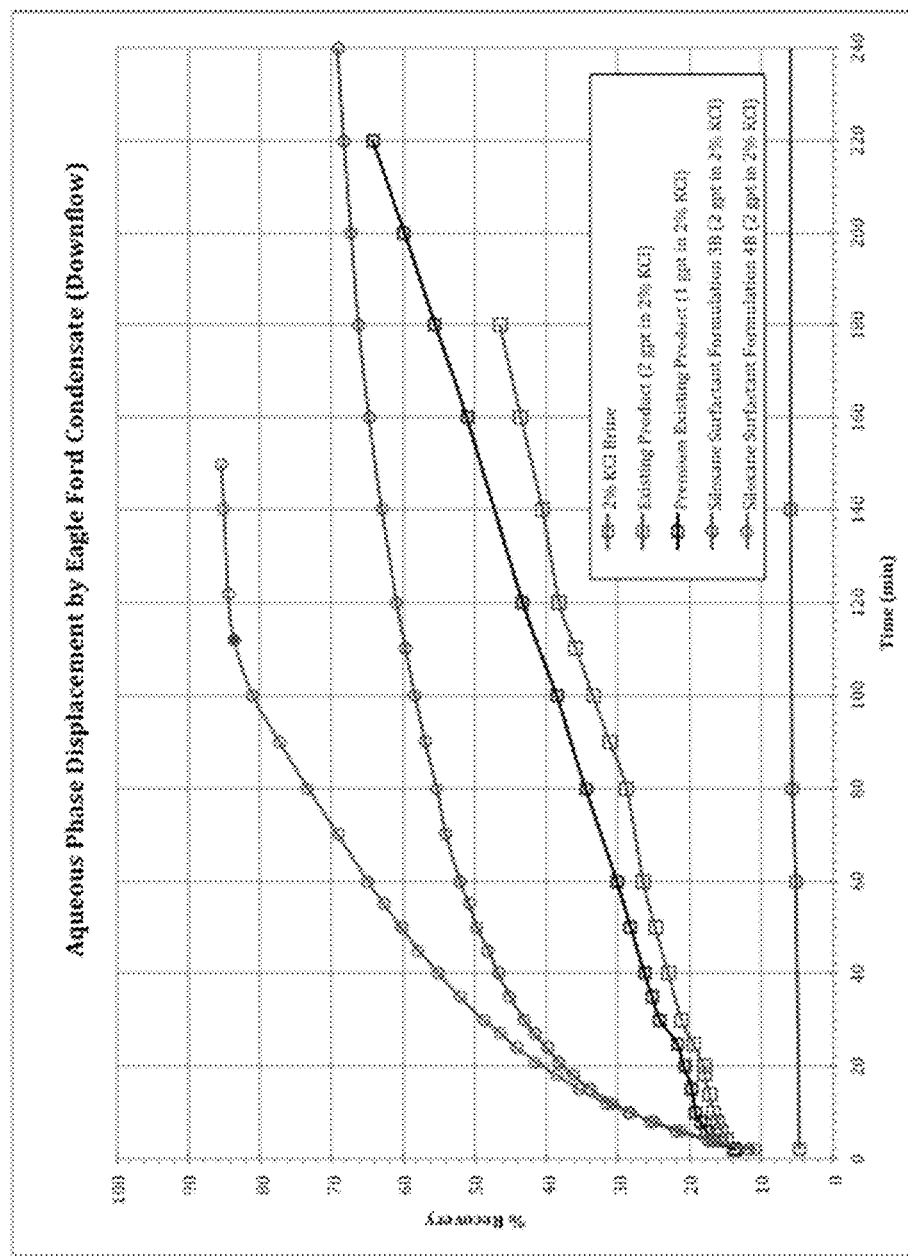
FIG. 3 provides a graph of aqueous phase displacement by Eagle Ford condensate for two siloxane surfactant microemulsion products compared with two existing commercial microemulsion products in a downflow experiment using 70/140 Ottawa Sand.

FIG. 3 shows the progression in performance enhancement from an all-hydrocarbon microemulsion formulation with increasing level of siloxane surfactant. Formulation 3B gave a surface tension of 28 mN/m, while 4B gave a surface tension value of 24.5 mN/m. Both siloxane surfactant formulations perform better than the commercial products. Thus, combining the siloxane surfactant with the hydrocarbon surfactant and the terpene solvent yields a microemulsion formulation with much improved performance.

Example 5

Figure 4:
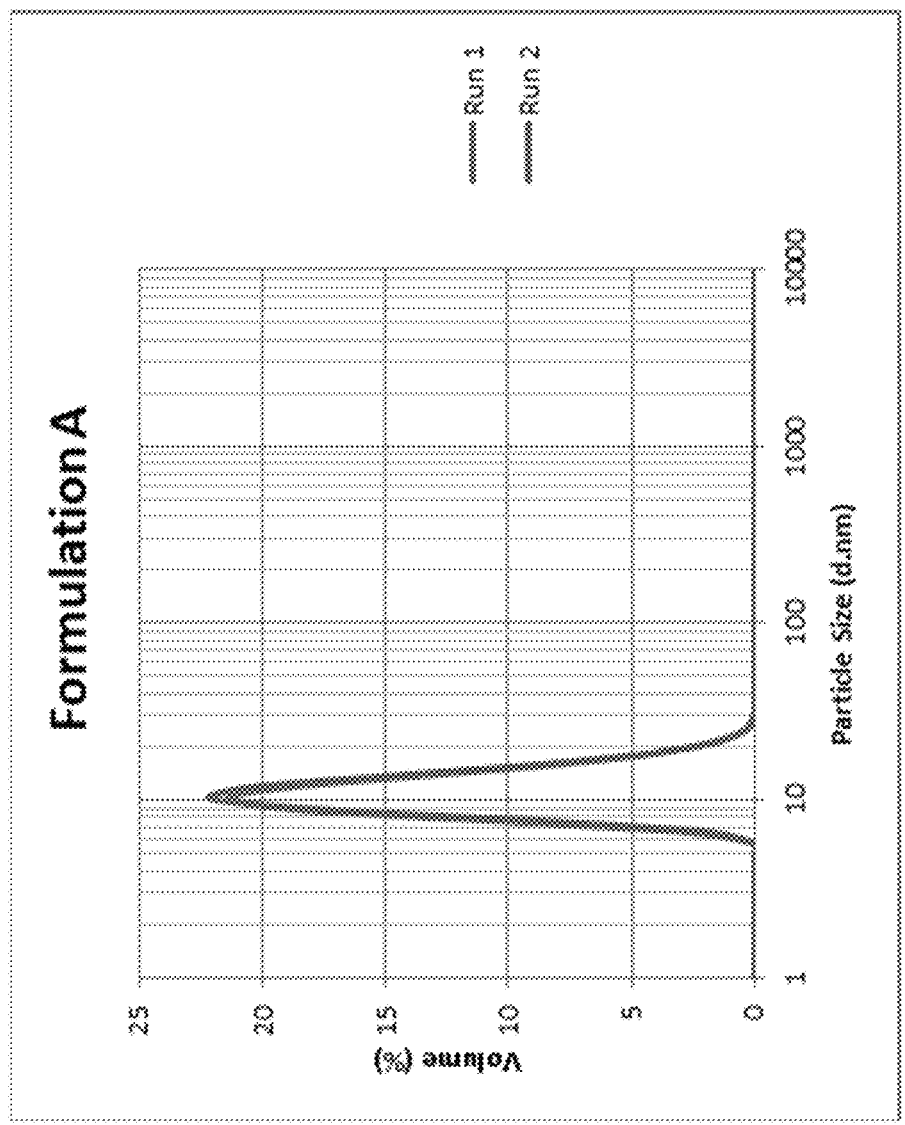
FIG. 4 provides a graph of particle size distribution for a 2 gpt dispersion of Formulation A in 2% KCl brine. The formulation disperses to a narrow single distribution of very small nanodroplets.

An additive was prepared using a combination of Dow Corning Xiameter® OFX-0190 Fluid (siloxane surfactant) with a detergent grade alcohol ethoxylate surfactant and d-limonene as the solvent, and its performance compared with that of the hydrocarbon surfactant. The ratio of the siloxane surfactant to the detergent grade alcohol ethoxylate (hydrocarbon) surfactant is 1:4 (by weight). FIG. 4 shows the particle size distribution of a 2 gpt dispersion of Formulation A into 2% KCl brine. The additive disperses to a narrow single distribution of very small nanodroplets, easily small enough to be compatible with the pore size of even low permeability tight shale gas formations. This formulation gave 87% aqueous phase displacement by condensate, and 73% aqueous phase displacement by gas (upflow).

Example 6

A further demonstration of the efficacy of a microemulsion prepared by combining a higher HLB highly efficient siloxane surfactant with a hydrocarbon surfactant and a terpene solvent. The siloxane surfactant had an HLB value of 13.2 and was combined with a detergent grade alcohol ethoxylate surfactant and d-limonene as the terpene solvent. Formulation 1 was prepared with a 1:1 ratio of water to terpene solvent, while Formulation 2 was prepared with a 6.5:1 ratio of water to terpene solvent. In both formulations, the surfactant mixture and concentration were identical. The surface tensions of both formulations before passing through the sand pack were about 21 mN/m. After contacting the sand pack the surface tensions increased 2-4 mN/m for the first pore volume, and negligible increase for the third pore volume. Both formulations reached excellent Eagle Ford condensate displacement values of about 90%-slightly better than the siloxane surfactant formulations shown in FIG. 3, and much better than the commercial microemulsion products shown in FIG. 3. These formulations achieved gas displacement values of 69-76% (see FIG. 2 for experimental details).

Example 7

Laboratory tests were conducted to characterize the effectiveness of various microemulsions and their ability to produce foam. The microemulsions used in these tests were prepared using several surfactants with different foamabilities. Two microemulsions were made with an alkoxylate trisiloxane surfactant mixed with isopropyl alcohol at a 1:1 ratio. The first, a high surfactant microemulsion, contained 90 parts by weight of the surfactant isopropyl alcohol mix, 5 parts by weight of terpene, and 5 parts by weight of water. The second, a low surfactant microemulsion, contained 60 parts by weight of the surfactant isopropyl alcohol mix, 20 parts by weight of terpene, and 20 parts by weight of water. A second surfactant comprised of linear $C_{12}$-$C_{15}$ alcohol ethoxylates with an average of 7 moles of ethylene oxide was mixed with isopropyl alcohol at a 1:1 ratio and used to make a standard microemulsion. The standard microemulsion contained 46 parts by weight of the surfactant isopropyl alcohol mix, 27 parts by weight of terpenes, and 27 parts by weight of water. The last surfactant used was an alkyl polyglucoside surfactant. The alkyl polyglucoside microemulsion was made using similar ratios as the low surfactant microemulsion described above. The microemulsions described above were used as treatments in foam tests.

To begin the foam testing procedure, 2 gallons per thousand of each treatment was diluted into 200 grams of solution (2% KCl with or without condensate). This solution containing treatment was put into a 1 liter jar on a WARING® blender. The WARING® blender was connected to a rheostat which was set to 70% of the maximum output voltage. The treated solution was mixed in the WARING® blender for 30 seconds on the low setting. Once mixed the solution was poured into a 1 liter graduated cylinder. The volume of the initial height of the foam was recorded in milliliters. The amount of time needed for the foam to break to 100 milliliters of liquid was also recorded. The examples in Tables 3, 4, and 5 show the percentage of foam increase for each microemulsion tested. This percentage was established by the difference in the volume of the solution before and after mixing:

Percent foam increase was determined by the following equation:

$$\% \text{ Foam Increase} = \frac{\text{Foam Height after Blending} - \text{Initial Liquid Volume}}{\text{Initial Liquid Volume}} \times 100$$

TABLE 3

Foam test results for 2 gpt of treatment in 2% KCl.

| Formulation | Surfactant | % Foam Increase |
|---|---|---|
| High Surfactant Microemulsion | Alkoxylated Trisiloxane A | 150 |
| Low Surfactant Microemulsion | Alkoxylated Trisiloxane A | 105 |
| Standard Microemulsion | $C_{12}$-$C_{15}$ Linear Alcohol Ethoxylate | 75 |
| Low Surfactant Microemulsion | $C_{10}$-$C_{16}$ Alkyl Polyglucoside | 35 |

TABLE 4

Foam test results for 2 gpt of treatment in 2% KCl with 0.5% condensate.

| Formulation | Surfactant | % Foam Increase |
|---|---|---|
| High Surfactant Microemulsion | Alkoxylated Trisiloxane A | 85 |
| Standard Microemulsion | $C_{12}$-$C_{15}$ Linear Alcohol Ethoxylate | 20 |

TABLE 5

Foam test results for 2 gpt of treatment in 2% KCl with 1.0% condensate.

| Formulation | Surfactant | % Foam Increase |
|---|---|---|
| High Surfactant Microemulsion | Alkoxylated Trisiloxane A | 55 |
| Low Surfactant Microemulsion | Alkoxylated Trisiloxane A | 55 |
| Low Surfactant Microemulsion | $C_{10}$-$C_{16}$ Alkyl Polyglucoside | 10 |

It is clear that the present invention is well adapted to carry out its objectives and attain the ends and advantages mentioned above as well as those inherent therein. While presently preferred embodiments of the invention have been described in varying detail for purposes of disclosure, it will be understood that numerous changes may be made which will readily suggest themselves to those skilled in the art and which are encompassed within the spirit of the invention disclosed and as defined in the written description and appended claims.

What is claimed is:

1. A well treatment additive comprising:
   a foam comprising:
   a gas selected from the group consisting of carbon dioxide, flu gas, methane, natural gas, and nitrogen;
   a microemulsion having a water based continuous phase and comprising a siloxane surfactant, a solvent, and an aqueous phase,
   wherein the solvent is a terpene hydrocarbon;
   wherein the siloxane surfactant is present in an amount between about 10 wt % and about 70 wt % versus the total weight of the microemulsion; and
   wherein the siloxane surfactant is an alkoxylated siloxane surfactant selected from the group consisting of:

$(CH_3)_3SiO(Si(CH_3)_2O)_nSi(CH_3)_2CH_2CH_2CH_2(OCH_2CH_2)_x(OCH(CH_3)CH_2)_yOR^3$, $R^3(OCH_2CH_2)_x(OCH(CH_3)CH_2)_yCH_2CH_2CH_2(CH_3)_2SiO(Si(CH_3)_2O)nSi(CH_3)_2CH_2CH_2CH_2(OCH_2CH_2)_x(OCH(CH_3)CH_2)_yOR^3$, and

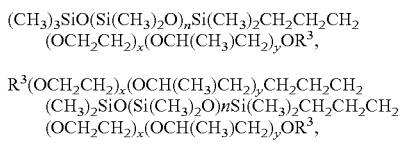

wherein each $R^3$ is independently H, —$CH_3$, or —C(O)$CH_3$, each n is independently 1-4, each x is independently 4-12, z is 3 or 4, and each y is independently 0-2.

2. The well treatment additive of claim 1, wherein the siloxane surfactant comprises an AB-type siloxane copolymer, an ABA-type siloxane copolymer, or a functionalized cyclosiloxane.

3. The well treatment additive of claim 1, wherein the solvent is present in the microemulsion in an amount between about 5 wt % and about 35 wt % versus the total weight of the microemulsion.

4. The well treatment additive of claim 1, wherein the siloxane surfactant comprises an alkoxylated siloxane surfactant.

5. The well treatment additive of claim 1, wherein the microemulsion further comprises a co-solvent.

6. The well treatment additive of claim 5, wherein the co-solvent is selected from the group consisting of methanol, ethanol, IPA, ethylene glycol, propylene glycol, dipropylene glycol monomethyl ether, triethylene glycol, ethylene glycol monobutyl ether, and combinations thereof.

7. The well treatment additive of claim 5, wherein the co-solvent is present in the microemulsion in an amount between about 5 wt % and about 20 wt % versus the total weight of the microemulsion.

8. The well treatment additive of claim 1, wherein the solvent is present in the microemulsion in an amount between about 3 wt % and about 50 wt %, versus the total weight of the microemulsion.

9. The well treatment additive of claim 5, wherein the co-solvent is present in the microemulsion in an amount between about 5 wt % and about 45 wt %, versus the total weight of the microemulsion.

10. A method of treating a wellbore of an oil and/or gas well comprising injecting the well treatment additive of claim 1 into the wellbore.

11. The well treatment additive of claim 1, wherein the gas is carbon dioxide.

12. The well treatment additive of claim 1, wherein the gas is nitrogen.

13. The well treatment additive of claim 4, wherein the siloxane surfactant is an alkoxylated trisiloxane.

14. The well treatment additive of claim 1, wherein the microemulsion further comprises a co-solvent.

15. The well treatment additive of claim 14, wherein the co-solvent is present in the microemulsion in an amount between about 5 wt % and about 20 wt % versus the total weight of the microemulsion.

16. A method of treating a wellbore of an oil and/or gas well comprising injecting the well treatment additive of claim 15 into the wellbore.

17. The method of claim 16, wherein the gas is carbon dioxide or nitrogen, or a combination thereof.

* * * * *